US011575338B2

(12) United States Patent
Tobari et al.

(10) Patent No.: US 11,575,338 B2
(45) Date of Patent: Feb. 7, 2023

(54) POWER CONVERSION DEVICE

(71) Applicant: Hitachi Industrial Equipment Systems Co., Ltd., Tokyo (JP)

(72) Inventors: Kazuaki Tobari, Tokyo (JP); Agnes Hadinata, Tokyo (JP); Atsuhiko Nakamura, Tokyo (JP); Hiroshi Watanabe, Tokyo (JP); Yusaku Onuma, Tokyo (JP); Takuya Sugimoto, Tokyo (JP); Yoshiyuki Taguchi, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 85 days.

(21) Appl. No.: 17/422,509

(22) PCT Filed: Apr. 28, 2020

(86) PCT No.: PCT/JP2020/018053
§ 371 (c)(1),
(2) Date: Jul. 13, 2021

(87) PCT Pub. No.: WO2020/261751
PCT Pub. Date: Dec. 30, 2020

(65) Prior Publication Data
US 2022/0094291 A1 Mar. 24, 2022

(30) Foreign Application Priority Data
Jun. 25, 2019 (JP) .............................. JP2019-117692

(51) Int. Cl.
*H02P 27/08* (2006.01)
(52) U.S. Cl.
CPC ................................ *H02P 27/08* (2013.01)

(58) Field of Classification Search
CPC .. H02P 21/00; H02P 21/0003; H02P 21/0021; H02P 21/0085; H02P 21/04;
(Continued)

(56) References Cited

U.S. PATENT DOCUMENTS 7,042,193 B2* 5/2006 Kinpara ................. H02P 21/24
318/807
2015/0028793 A1 1/2015 Yoshimoto et al.

FOREIGN PATENT DOCUMENTS

JP 62-272891 A 11/1987
JP 3-218291 A 9/1991
(Continued)

OTHER PUBLICATIONS

International Search Report (PCT/ISA/210) issued in PCT Application No. PCT/JP2020/018053 dated Aug. 11, 2020 with English translation (six (6) pages).
(Continued)

*Primary Examiner* — Antony M Paul
(74) *Attorney, Agent, or Firm* — Crowell & Moring LLP

(57) ABSTRACT

This power conversion device comprises: a power converter including a switching element; and a control unit which controls the power converter. The control unit calculates a torque electric current detection value and an excitation electric current detection value from an electric current flowing to an external device, and when an absolute value of the torque electric current detection value is greater than or equal to the excitation electric current detection value, performs control such that the excitation electric current detection value follows the torque electric current detection value.

14 Claims, 9 Drawing Sheets

(58) Field of Classification Search
CPC .......... H02P 21/06; H02P 21/08; H02P 21/10; H02P 21/12; H02P 21/14; H02P 21/141; H02P 21/18; H02P 21/20; H02P 21/22; H02P 21/26; H02P 21/28; H02P 21/30; H02P 23/00; H02P 23/0004; H02P 23/0027; H02P 23/07; H02P 23/14; H02P 23/26; H02P 23/30; H02P 25/062; H02P 25/00; H02P 25/064; H02P 27/00; H02P 27/04; H02P 27/06; H02P 27/08; H02P 1/26; H02P 1/24; H02P 1/42; H02P 6/08
See application file for complete search history.

(56) References Cited

FOREIGN PATENT DOCUMENTS

| | | |
|---|---|---|
| JP | 2000-308400 A | 11/2000 |
| JP | 2007-14080 A | 1/2007 |
| JP | 2008-61477 A | 3/2008 |
| JP | 2013-78169 A | 4/2013 |
| WO | WO 2013/115240 A1 | 8/2013 |

OTHER PUBLICATIONS

Japanese-language Written Opinion (PCT/ISA/237) issued in PCT Application No. PCT/JP2020/018053 dated Aug. 11, 2020 (five (5) pages).

\* cited by examiner

F I G. 2
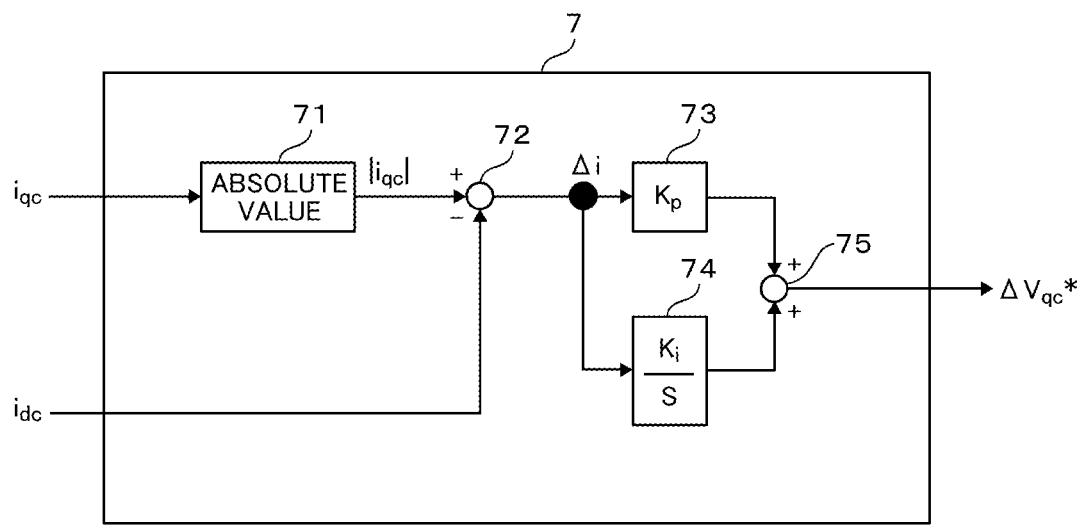

POWER CONVERSION DEVICE

TECHNICAL FIELD

The present invention relates to a power conversion device.

BACKGROUND ART

Examples of a highly efficient control method of an induction motor include Patent Document 1. In Patent Document 1, it is described that in a hydraulic unit, an excitation electric current according to vector control is forcibly changed in accordance with a discharge pressure of a hydraulic pump or torque of an induction motor, and an electric current of supply power with respect to the discharge pressure or the torque is minimized.

Then, it is described that a vector control unit determines a minimum value of a supply electric current of the induction motor that satisfies required torque corresponding to a torque instruction value and sets an excitation electric current instruction value such that the supply electric current with respect to the induction motor is minimized by providing a table relevant to a pressure and an electric current.

CITATION LIST

Patent Document

Patent Document 1: JP 2013-78169 A

SUMMARY OF THE INVENTION

Problems to be Solved by the Invention

In Patent Document 1, the minimum value of the supply electric current of the induction motor is determined on the basis of the torque instruction value, and the excitation electric current instruction value from an excitation electric current calculation unit. However, it is required that an electric current flowing to the motor is detected, and highly efficient control is performed such that the electric current is reduced on the basis of the detected electric current.

In addition, in Patent Document 1, it is necessary to prepare a pressure/electric current table for each hydraulic unit, and such a control method is not capable of being applied to a general-purpose inverter not including the pressure/electric current table or the like.

An object of the present invention is to provide a power conversion device with highly efficient control properties.

Solutions to Problems

A preferred example of the present invention is a power conversion device, including: a power converter including a switching element; and a control unit which controls the power converter, in which the control unit calculates a torque electric current detection value and an excitation electric current detection value from an electric current flowing to an external device, and when an absolute value of the torque electric current detection value is greater than or equal to the excitation electric current detection value, performs control such that the excitation electric current detection value follows the torque electric current detection value.

Effects of the Invention

According to the present invention, highly efficient control properties can be attained.

BRIEF DESCRIPTION OF THE DRAWINGS

FIG. 2 is a diagram illustrating a configuration of a voltage instruction correction calculation unit in Example 1.

MODE FOR CARRYING OUT THE INVENTION

Hereinafter, examples will be described in detail by using the drawings.

Example 1

Figure 1:
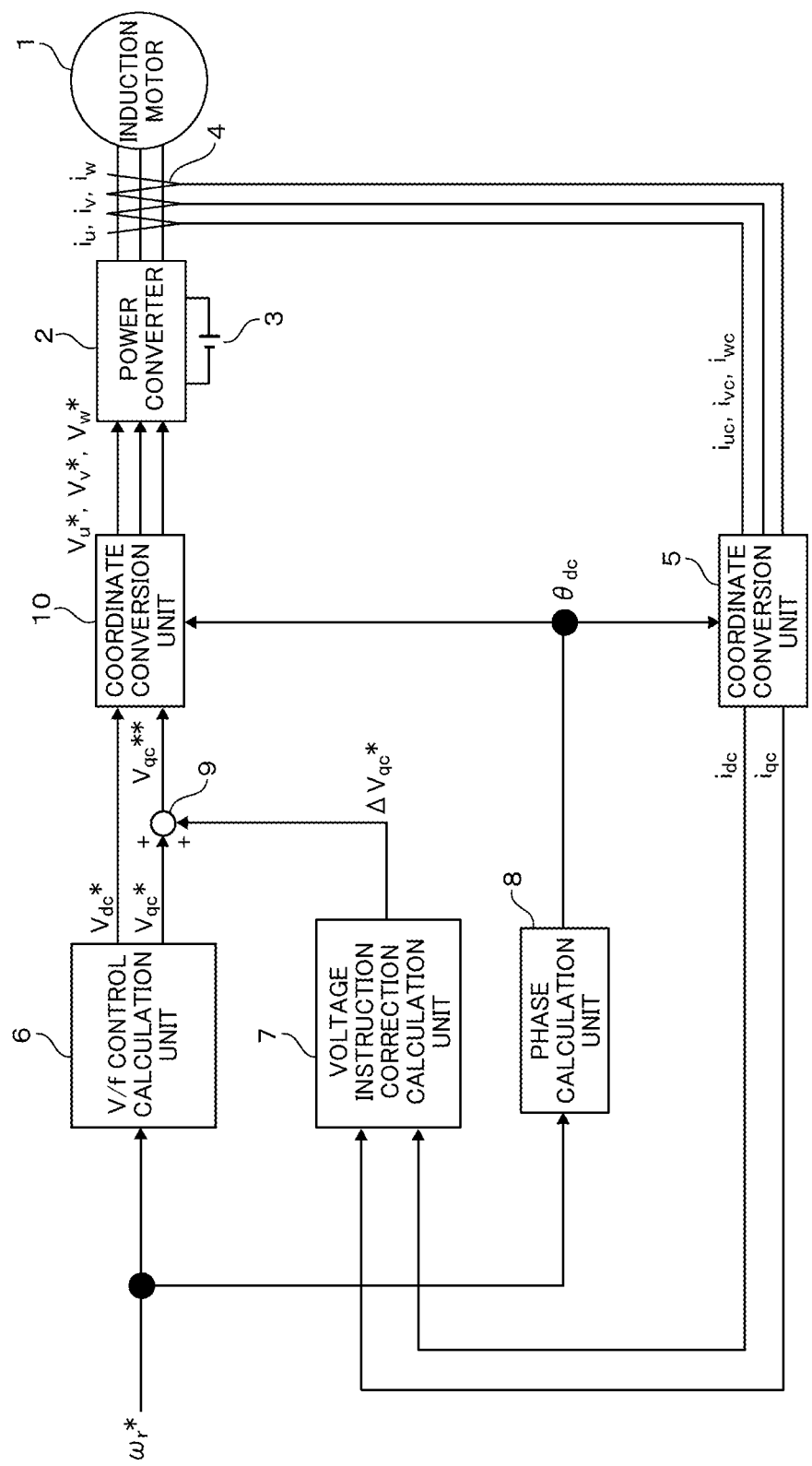
FIG. 1 is a system configuration diagram including a power conversion device and an induction motor in Example 1.

FIG. 1 is a system configuration diagram including a power conversion device and an induction motor 1 that is an external device in Example 1. The induction motor 1 generates torque by a magnetic flux that is generated by an excitation electric current of a magnetic flux axis (d axis) component, and a torque electric current of a torque axis (q axis) component orthogonal to the magnetic flux axis.

A power converter 2 includes a semiconductor element as a switching element. The power converter 2 inputs three-phase alternating-current voltage instruction values $v_u^*$, $v_v^*$, and $v_w^*$, and prepares and outputs voltage values proportional to the three-phase alternating-current voltage instruction values $v_u^*$, $v_v^*$, and $v_w^*$. An output voltage value and an output frequency value of the induction motor 1 are variable on the basis of the output of the power converter 2. IGBT may be used as the switching element.

A direct-current power source 3 supplies a direct-current voltage to the power converter 2.

An electric current detector 4 outputs $i_{uc}$, $i_{vc}$, and $i_{wc}$ that are detection values of three-phase alternating-current electric currents $i_u$, $i_v$, and $i_w$ of the induction motor 1. The electric current detector 4 may detect two phases in three phases of the induction motor 1, for example, may detect a u-phase line electric current and a w-phase line electric current, and may obtain v phase line electric current as $i_v=-(i_u+i_w)$ from an alternating-current condition ($i_u+i_v+i_w=0$).

In this example, an example is described in which the electric current detector 4 is provided in the power conversion device, but the electric current detector 4 may be provided outside the power conversion device.

A control unit includes a coordinate conversion unit 5, a V/f control calculation unit 6, a voltage instruction correction calculation unit 7, a phase calculation unit 8, an addition unit 9, and a coordinate conversion unit 10, described below. Then, the control unit controls the power converter 2.

The control unit includes a semiconductor integrated circuit (a calculation controller) such as a microcomputer or a digital signal processor (DSP).

Next, each constituent of the control unit which controls the power converter 2 will be described.

The coordinate conversion unit 5 calculates and outputs an electric current detection value $i_{dc}$ of a d axis and an electric current detection value $i_{qc}$ of a q axis from the alternating-current electric current detection values $i_{uc}$, $i_{vc}$, and $i_{wc}$ of the three-phase alternating-current electric currents $i_u$, $i_v$, and $i_w$, and a phase calculation value $\theta_{dc}$.

The V/f control calculation unit 6 outputs a voltage instruction value $v_{dc}^*$ of the d axis that is the value of zero, and a voltage instruction value $v_{qc}^*$ of the q axis that is proportional to a frequency instruction value $\psi_r^*$.

The voltage instruction correction calculation unit 7 outputs a voltage correction value $\Delta v_{qc}^*$ of the q axis that is calculated on the basis of the electric current detection value $i_{qc}$ of the q axis and the electric current detection value $i_{dc}$ of the d axis.

The phase calculation unit 8 outputs the phase calculation value $\theta_{dc}$ by integrating the frequency instruction value $\omega_r^*$.

The addition unit 9 outputs a second voltage instruction value $v_{qc}^{**}$ of the q axis by adding the voltage instruction value $v_{qc}^*$ of the q axis and the voltage correction value $\Delta v_{qc}^*$ of the q axis.

The coordinate conversion unit 10 outputs three-phase alternating-current voltage instruction values $v_u^*$, $v_v^*$, and $v_w^*$ from the voltage instruction value $v_{dc}^*$ of the d axis, the voltage instruction value $v_{qc}^{**}$ of the q axis, and the phase calculation value $\theta_{dc}$.

First, a basic operation of a V/f control method in a case of using the voltage instruction correction calculation unit 7 that is the characteristic of this example will be described.

In the V/f control calculation unit 6, the voltage instruction value $v_{qc}^*$ of the q axis is output in accordance with (Expression 1) by using the voltage instruction value $v_{dc}^*$ of the d axis that is the value of zero, the frequency instruction value $\omega_r^*$, and a direct-current voltage $E_{DC}$.

[Expression 1]

$$\begin{bmatrix} v_{dc}^* = 0 \\ v_{qc}^* = \frac{2}{\sqrt{3}} \cdot \frac{E_{DC}/2}{\omega_{r\_max}} \cdot \omega_r^* \end{bmatrix} \quad (1)$$

Here, $\omega_{r\_max}$ is a basilar angle frequency.

In the phase calculation unit 8, a phase $\theta_{dc}$ of the magnetic flux axis of the induction motor 1 is calculated in accordance with (Expression 2).

[Expression 2]

$$\theta_{dc} = \frac{1}{s} \cdot \omega_r^* \quad (2)$$

FIG. 2 is a diagram illustrating a function block of the voltage instruction correction calculation unit 7 in Example 1.

In an absolute value calculation unit 71, the electric current detection value $i_{qc}$ of the q axis is input, and an absolute value $|i_{qc}|$ of $i_{qc}$ is output.

In a subtraction unit 72, the absolute value $|i_{qc}|$ of the $i_{qc}$ and the electric current detection value $i_{dc}$ of the d axis are input, and an electric current deviation $\Delta i$ is output. The electric current deviation $\Delta i$ when the absolute value $|i_{qc}|$ of the torque electric current detection value is greater than or equal to the excitation electric current detection value $i_{dc}$ is input to a proportional calculation unit 73 having a constant of a proportional gain $K_p$ and an integral calculation unit 74 having a constant of $K_i$. An output signal of the proportional calculation unit 73 and the integral calculation unit 74 is input to an addition unit 75. As a result thereof, the correction value $\Delta v_{qc}^*$ of the voltage instruction value $v_{qc}^*$ of the q axis is calculated by calculation represented in (Expression 3). As described above, control of correcting the voltage instruction value $v_{qc}^*$ of the q axis is performed such that the electric current detection value $i_{dc}$ of the d axis follows the absolute value of the electric current detection value $i_{qc}$ of the q axis. Here, $K_{p1}$ is a proportional gain, and $K_{i1}$ is an integral gain.

[Expression 3]

$$\Delta v_{qc}^* = \left(K_{p1} + \frac{K_{i1}}{s}\right) \cdot \Delta i \quad (3)$$

Figure 3:
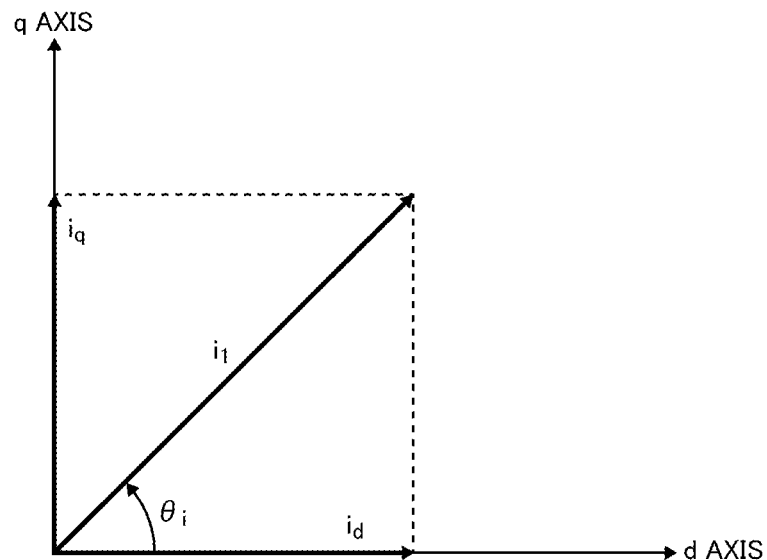
FIG. 3 is a diagram illustrating an electric current vector of the induction motor.

The principle that this example is highly efficient will be described. FIG. 3 is a diagram illustrating an electric current vector of the induction motor 1. In a case where the direction of the magnetic flux that is generated by an excitation electric current $i_d$ is the d axis, a direction $\pi/2$ ahead thereof is the q axis that is the torque axis, and a phase angle between a motor electric current $i_1$ and the excitation electric current $i_d$ is $\theta_i$, the excitation electric current $i_d$ and a torque electric current $i_q$ are given by Expression (4). Here, the motor electric current $i_1$ may be a peak value of any one of the alternating-current electric current detection values $i_{uc}$, $i_{vc}$, and $i_{wc}$.

[Expression 4]

$$\begin{aligned} i_d &= i_1 \cos\theta_i \\ i_q &= i_1 \sin\theta_i \end{aligned} \quad (4)$$

In (Expression 4), when phase angle $\theta_i=\pi/4$, the motor electric current $i_1$ is minimized by the relationship of (Expression 5) at the same torque.

[Expression 5]

$$i_d = i_q = \frac{1}{\sqrt{2}} i_1 \quad (5)$$

Torque τ of the induction motor 1 is given by (Expression 6).

[Expression 6]

$$\tau = \frac{3}{2} P_m \frac{M}{L_2} (\phi_{2d} i_q - \phi_{2q} i_d) \quad (6)$$

Here, Pm is the number of pole pairs (the value of ½ of the number of motor poles), M is mutual inductance, $L_2$ is secondary inductance, $\phi_{2d}$ is a secondary magnetic flux of the d axis, and $\phi_{2q}$ is a secondary magnetic flux of the q axis.

Here, an ideal condition of the magnetic flux in motor control is (Expression 7), and

[Expression 7]

$$\left.\begin{array}{l}\phi_{2d} = M i_d \\ \phi_{2q} = 0\end{array}\right\} \quad (7)$$

when (Expression 7) is assigned to (Expression 6), (Expression 8) is obtained.

[Expression 8]

$$\tau = \frac{3}{2} P_m \frac{M}{L_2} \phi_{2d} i_q = \frac{3}{2} P_m \frac{M^2}{L_2} i_d i_q \quad (8)$$

Further, when (Expression 5) is assigned to (Expression 8), (Expression 9) that is a torque expression when the motor electric current is minimized is obtained.

[Expression 9]

$$\tau = \frac{3}{2} P_m \frac{M^2}{L_2} i_1^2 \quad (9)$$

In this example, in order to respond to both of a power running operation and a regenerative operation, an absolute value of the torque electric current $i_q$ is calculated, and the voltage instruction value $v_{qc}^*$ of the q axis is corrected such that the excitation electric current $i_d$ follows the absolute value of the torque electric current $i_q$.

Figure 4A:
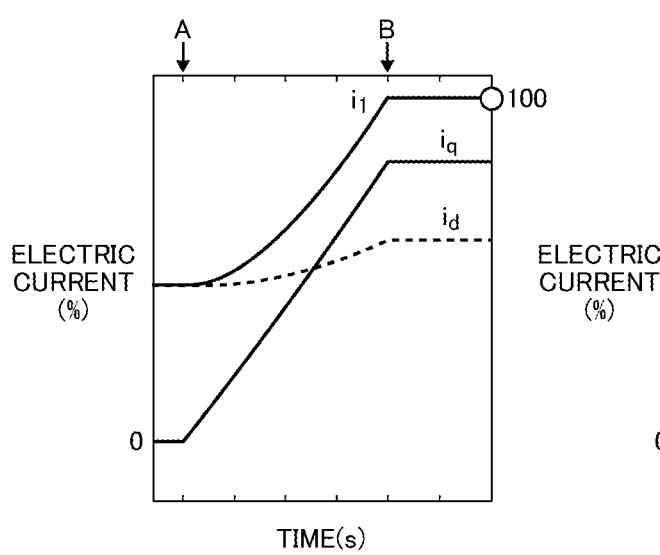
FIGS. 4A and 4B are diagrams illustrating electric current control properties.
Figure 4B:
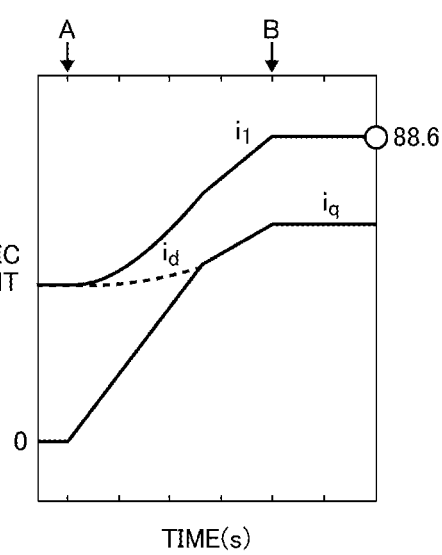

FIG. 4 is a diagram illustrating electric current control properties of Example 1 and a comparative example. FIG. 4(a) is a diagram illustrating electric current control properties of a state in which the voltage instruction correction calculation unit 7 is not operated by V/f control. FIG. 4(b) is a diagram illustrating electric current control properties of a state in which the voltage instruction correction calculation unit 7 is operated.

In both of FIG. 4(a) and FIG. 4(b), lamp-shaped load torque starts to be applied from a point A in the drawing, the size of rated torque is obtained at a point B in the drawing, and rated torque is applied from the point B to the right. In a case where an electric current value of FIG. 4(a) is 100%, an electric current value of FIG. 4(b) is 88.6%, and thus, it is found that there is a reduction of approximately 11.4%. The effects of this example are apparent.

In this example, the control unit performs the control of correcting the voltage instruction value $v_{qc}^*$ of the q axis such that the electric current detection value $i_{dc}$ of the d axis follows the absolute value of the electric current detection value $i_{qc}$ of the q axis, and thus, the electric current value is smaller and highly efficient electric current properties can be attained, compared to the electric current properties of the V/f control.

Figure 5:
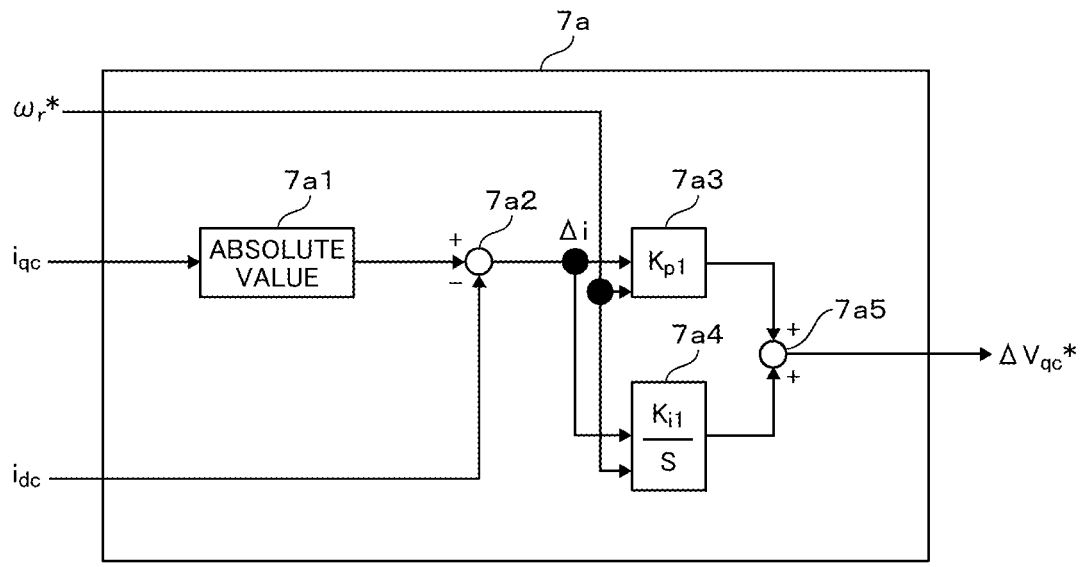
FIG. 5 is a diagram illustrating a modification example of the voltage instruction correction calculation unit of Example 1.

In addition, in this example, in the voltage instruction correction calculation unit 7, the gain ($K_p$, $K_i$) of proportional calculation and integral calculation is a fixed value, but may be changed in accordance with the frequency instruction value $\omega_r^*$, as illustrated in FIG. 5. FIG. 5 is a diagram illustrating a modification example of Example 1, and is a function block of a voltage instruction correction calculation unit 7a which changes the gain ($K_p$, $K_i$) of the proportional calculation and the integral calculation, in accordance with the frequency instruction value $\omega_r^*$.

The voltage instruction correction calculation unit 7a in FIG. 5 is a modification example of the voltage instruction correction calculation unit 7 in FIG. 2. In addition, 7a1 and 7a2 in FIG. 5 are identical to the absolute value calculation unit 71 and the subtraction unit 72 in FIG. 2.

As illustrated in FIG. 5, Δi that is a deviation between the absolute value |$i_{qc}$| of the electric current detection value $i_{qc}$ of the q axis and the electric current detection value $i_{dc}$ of the d axis is input to a proportional calculation unit 7a3 having the gain $K_{p1}$ of the proportional calculation that is changed in accordance with the size of the frequency instruction value $\omega_r^*$ and an integral calculation unit 7a4 having the gain $K_{i1}$ of the integral calculation that is changed in accordance with the size of the frequency instruction value $\omega_r^*$. An output value of the proportional calculation unit 7a3 and an output value of the integral calculation unit 7a4 are added by an addition unit 7a5, and are output as a correction value $\Delta v_{qc}^{**}$ of the voltage instruction value $v_{qc}^*$ of the q axis.

In FIG. 5, $K_{p1}$ and $K_{i1}$ are changed approximately in proportion to the size of the frequency instruction value $\omega_r^*$, and thus, a mechanism in which the electric current detection value $i_{dc}$ of the d axis follows the absolute value |$i_{qc}$| of the electric current detection value $i_{qc}$ of the q axis is changed in accordance with a frequency. That is, in a low-velocity area to a high-velocity area, the stability of a feedback loop relevant to highly efficient control can be improved, and a motor electric current value can be minimized within a shorter period of time.

Figure 6:
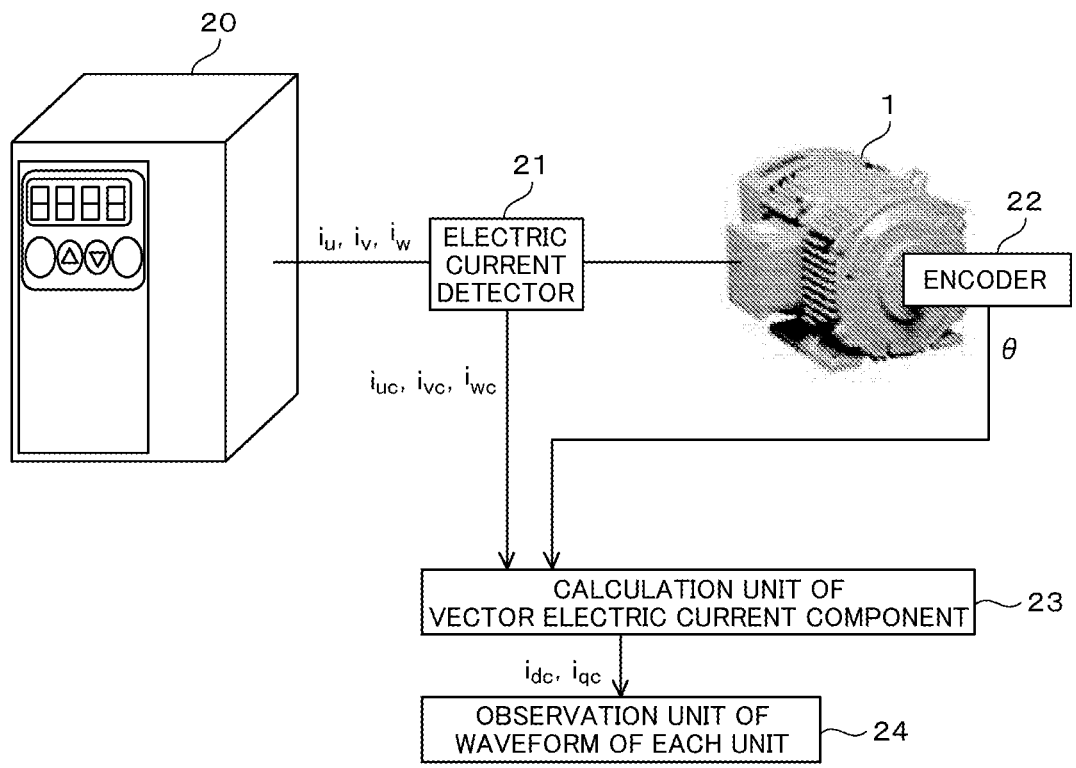
FIG. 6 is a diagram describing a verification method.

FIG. 6 is a diagram describing a verification method in a case of adopting this example. An electric current detector 21 is attached to a power conversion device 20 which drives the induction motor 1, and an encoder 22 is attached to a shaft of the induction motor 1.

The three-phase alternating-current electric current detection values ($i_{uc}$, $i_{vc}$, and $i_{wc}$) that are the output of the electric current detector 21 and a position 9 that is the output of the encoder are input to a calculation unit 23 of a vector electric current component, and the electric current detection value $i_{dc}$ of the d axis and the electric current detection value $i_{qc}$ of the q axis of the vector electric current component are output.

In an observation unit 24 of the waveform of each unit, when the electric current detection value $i_{qc}$ of the q axis is greater than the electric current detection value $i_{dc}$ of the d axis, as illustrated in FIG. 4(b), it is apparent that this example is adopted insofar as the electric current detection value $i_{dc}$ of the d axis follows the electric current detection value $i_{qc}$ of the q axis.

Example 2

Figure 7:
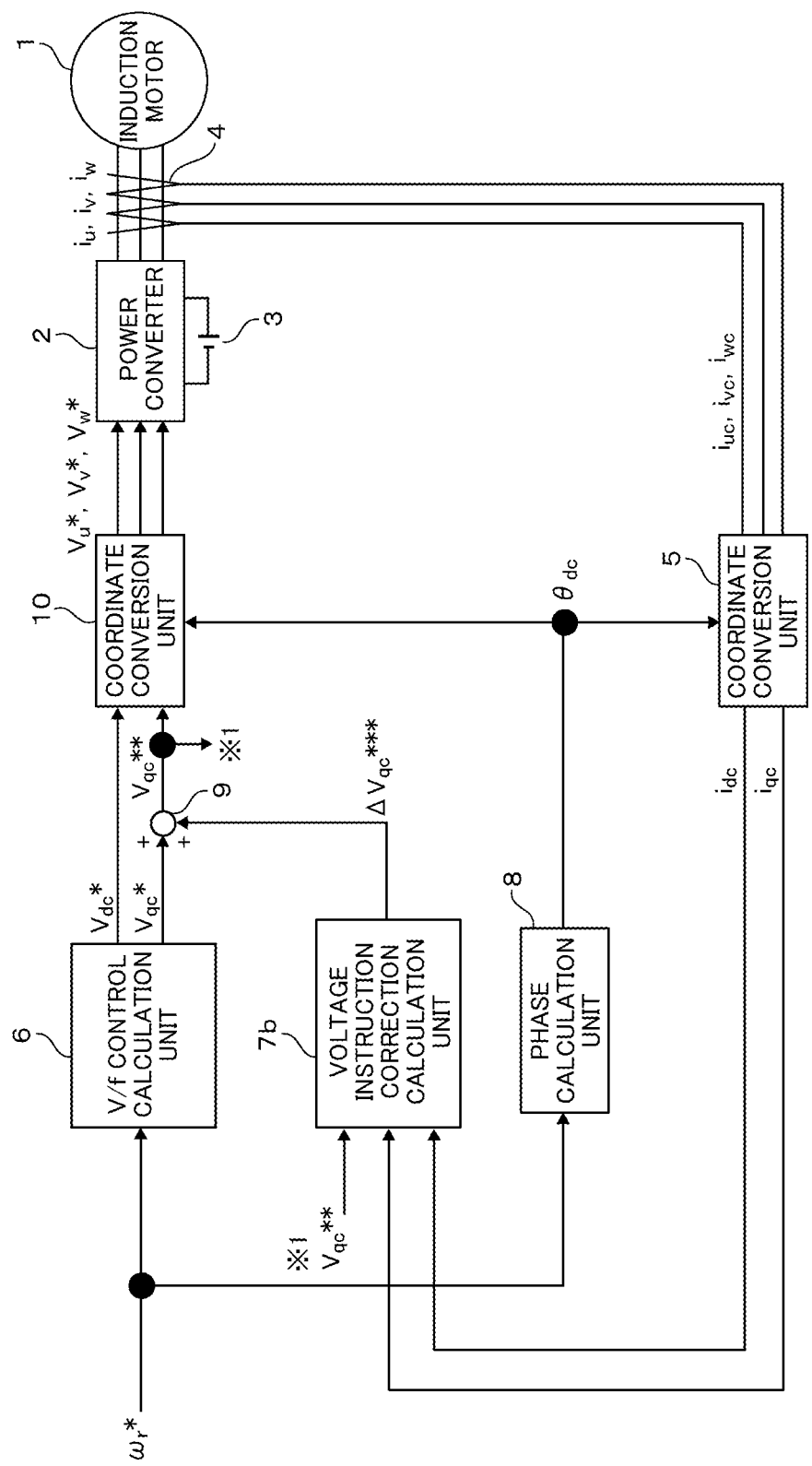
FIG. 7 is a system configuration diagram including a power conversion device and an induction motor in Example 2.

FIG. 7 is a diagram illustrating the configuration of a system including a power conversion device and the induction motor 1 Example 2. In Example 1, the absolute value of the torque electric current $i_q$ is calculated, and the excitation electric current $i_d$ is allowed to follow the absolute value of the torque electric current $i_q$, but in this example, an absolute value $|Q_c|$ of reactive power is allowed to follow an absolute value $|P_c|$ of effective power.

In FIG. 7, the induction motor 1, the power converter 2, the electric current detector 4, the coordinate conversion unit 5, the V/f control calculation unit 6, the phase calculation unit 8, the addition unit 9, and the coordinate conversion unit 10 are identical to those in FIG. 1. A voltage instruction correction calculation unit 7*b* included in the control unit outputs a correction value $\Delta v_{qc}^{***}$ of the voltage instruction value $v_{qc}^*$ of the q axis, on the basis of the absolute value $|P_c|$ of an effective power calculation value and an absolute value $|Q_c|$ of a reactive power calculation value.

Figure 8:
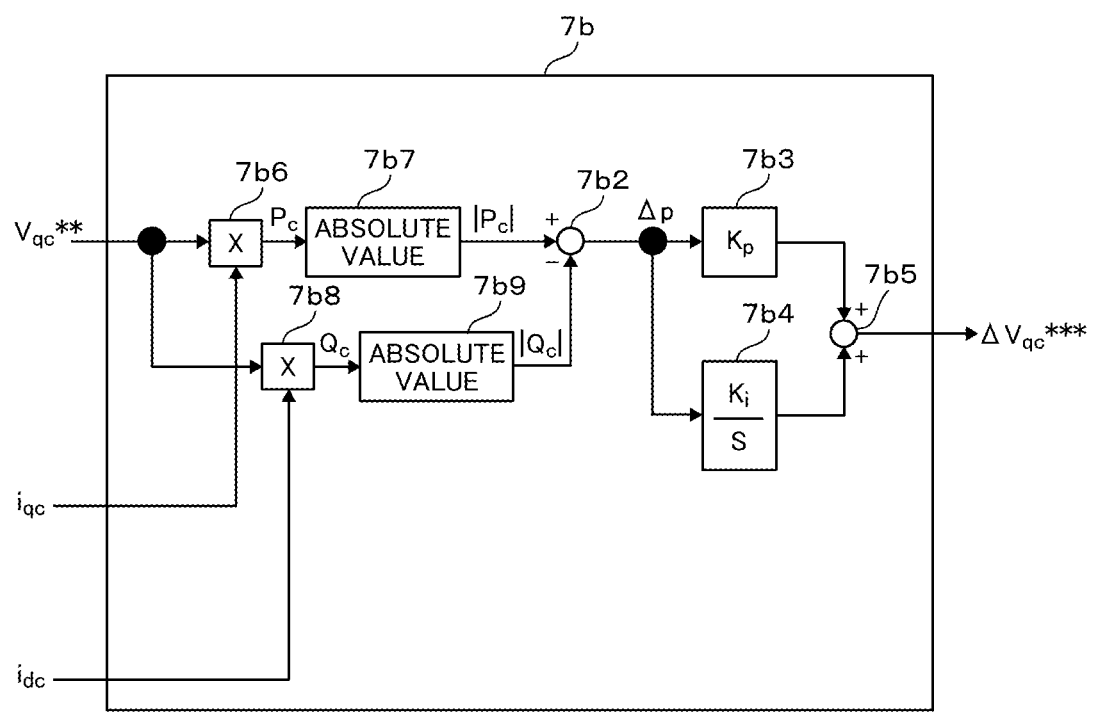
FIG. 8 is a diagram illustrating a configuration of a voltage instruction correction calculation unit in Example 2.

FIG. 8 illustrates the configuration of the voltage instruction correction calculation unit 7*b*. 7*b*3 illustrates a proportional calculation unit. 7*b*4 illustrates an integral calculation unit. 7*b*5 illustrates the addition unit 75. The voltage instruction value $v_{qc}^{}$ of the q axis and the electric current detection value $i_{qc}$ of the q axis are input to a multiplication unit 7*b*6, and an effective power calculation value $P_c$ that is a multiplication value thereof is output. The effective power calculation value $P_c$ that is the output of the multiplication unit 7*b*6 is input to an absolute value calculation unit 7*b*7**, and the absolute value $|P_c|$ of $P_c$ is output.

The voltage instruction value $v_{qc}^{}$ of the q axis and the electric current detection value $i_{dc}$ of the d axis are input to a multiplication unit 7*b*8, and a reactive power calculation value $Q_c$ that is a multiplication value thereof is output. The reactive power calculation value $Q_c$ that is the output of the multiplication unit 7*b*8 is input to an absolute value calculation unit 7*b*9**, and the absolute value $|Q_c|$ of $Q_c$ is output.

In a subtraction unit 7*b*2, the absolute value $|P_c|$ of $P_c$ and the absolute value $|Q_c|$ of $Q_c$ are input, and a power deviation $\Delta p$ is output. The power deviation $\Delta p$ is input to the proportional calculation unit 7*b*3 having the constant of the proportional gain $K_p$ and the integral calculation unit 7*b*4 having the constant of $K_i$, and an output signal thereof is input to the addition unit 7*b*5. The correction value $\Delta v_{qc}^{***}$ of the voltage instruction value $v_{qc}^*$ of the q axis is calculated by calculation represented in (Expression 10).

[Expression 10]
$$\Delta v_{qc}^{***} = \left(K_{p2} + \frac{K_{i2}}{s}\right) \cdot \Delta p \tag{10}$$

Here, $K_{p2}$ is a proportional gain, and $K_{i2}$ is an integral gain.

Here, the principle that this example is highly efficient will be described. When the voltage instruction value $v_{dc}^*$ of the d axis=0, the effective power $P_c$ that is calculated on a control axis is given by (Expression 11).

[Expression 11]
$$P_c = v_{qc} i_{qc} = \left(R_1 i_{qc} + \omega_1 L_\sigma i_{dc} + \omega_1 \frac{M}{L_2} \phi_{2d}\right) i_{qc}$$
$$= R_1 i_{qc}^2 + \omega_1 L_\sigma i_{dc} i_{qc} + \omega_1 \frac{M}{L_2} \phi_{2d} i_{qc} \tag{11}$$

The absolute value of the effective power $P_c$ is (Expression 12).

[Expression 12]
$$|P_c| = \left|R_1 i_{qc}^2 + \omega_1 L_\sigma i_{dc} i_{qc} + \omega_1 \frac{M}{L_2} \phi_{2d} i_{qc}\right| \tag{12}$$

In addition, the reactive power Qc that is calculated on the control axis is given by (Expression 13).

[Expression 13]
$$Q_c = -v_{qc} i_{dc}$$
$$= -\left(R_1 i_{qc} + \omega_1 L_\sigma i_{dc} + \omega_1 \frac{M}{L_2} \phi_{2d}\right) i_{dc}$$
$$= -R_1 i_{qc} i_{dc} - \omega_1 L_\sigma i_{dc}^2 - \omega_1 \frac{M}{L_2} \phi_{2d} i_{dc} \tag{13}$$

The absolute value of the reactive power Qc is (Expression 14).

[Expression 14]
$$|Q_c| = \left|-R_1 i_{qc} i_{dc} - \omega_1 L_\sigma i_{dc}^2 - \omega_1 \frac{M}{L_2} \phi_{2d} i_{dc}\right| \tag{14}$$

The voltage instruction value $v_{qc}^*$ of the q axis is corrected by using $|P_c|$ and $|Q|$. In a case where control is performed such that (Expression 12)=(Expression 14), the following expression is given.

[Expression 15]
$$\left|R_1 i_{qc}^2 + \omega_1 L_\sigma i_{dc} i_{qc} + \omega_1 \frac{M}{L_2} \phi_{2d} i_{qc}\right| = \tag{15}$$
$$\left|-R_1 i_{qc} i_{dc} - \omega_1 L_\sigma i_{dc}^2 - \omega_1 \frac{M}{L_2} \phi_{2d} i_{dc}\right|$$

As a result thereof, in Example 2, $i_{dc}$ (the electric current detection value of the d axis)=$i_{qc}$ (the electric current detection value of the q axis) is indirectly obtained, which is directly obtained in Example 1, and thus, a highly efficient operation can be attained.

In Example 2, as with the example of FIG. 5, the gain $K_{p1}$ of the proportional calculation and the gain $K_{i1}$ of the integral calculation are changed approximately in proportion to the size of the frequency instruction value $\omega_r^*$, and thus, in the low-velocity area to the high-velocity area, the stability of the feedback loop relevant to the highly efficient control can be improved, and the motor electric current value can be minimized within a shorter period of time.

Example 3

Figure 9:
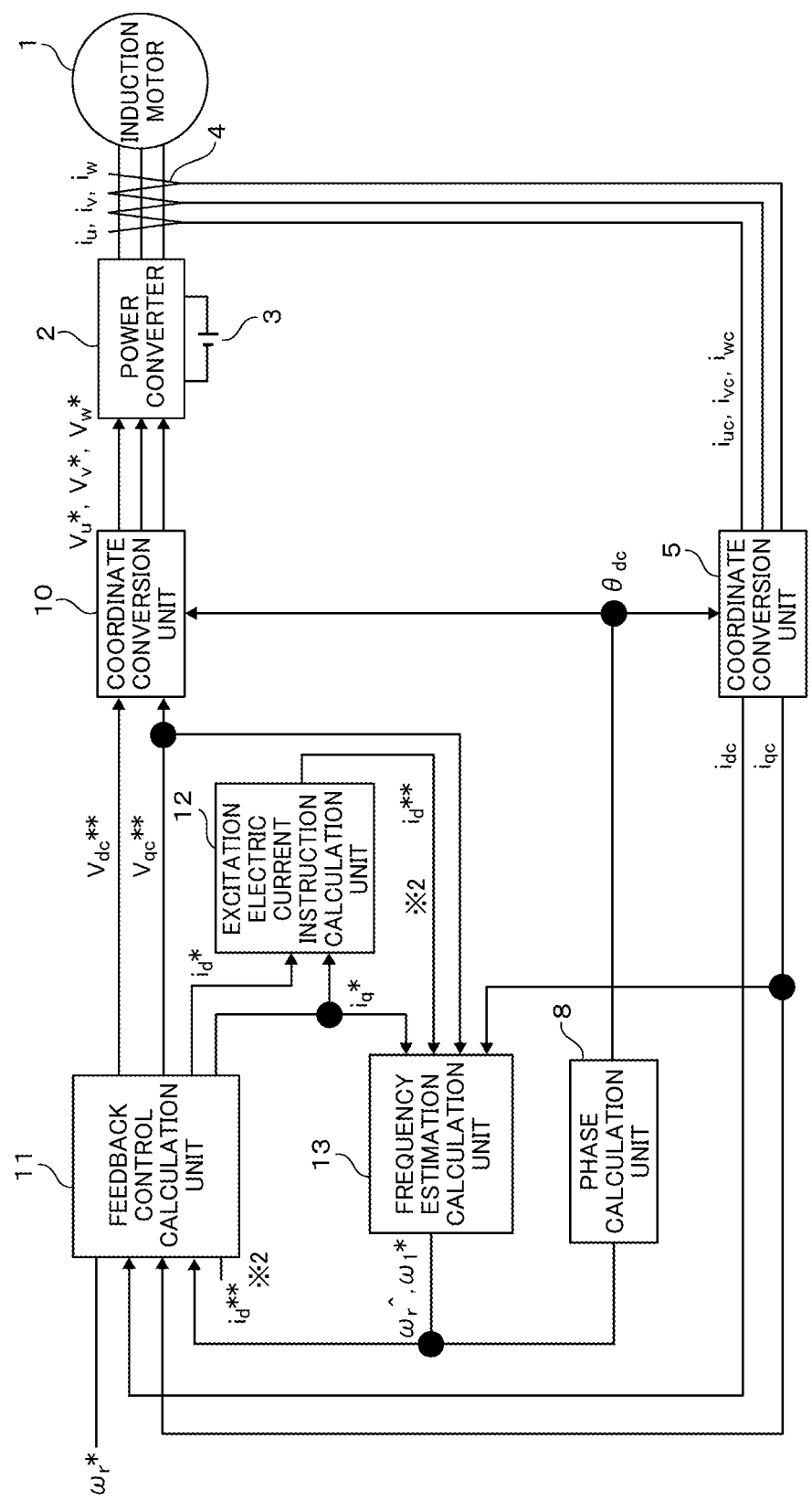
FIG. 9 is a system configuration diagram including a power conversion device and an induction motor in Example 3.

FIG. 9 is a system configuration diagram including a power conversion device and an induction motor in Example 3. In Example 1 and Example 2, the induction motor 1 is subjected to the V/f control, but in Example 3, the calculation of velocity control, electric current control, and vector control is performed.

In FIG. 9, the induction motor 1, the power converter 2, the direct-current power source 3, the electric current detector 4, the coordinate conversion unit 5, the phase calculation unit 8, and the coordinate conversion unit 10 are identical to those in FIG. 1.

The control unit includes the coordinate conversion unit 5, the phase calculation unit 8, the coordinate conversion unit 10, a feedback control calculation unit 11, an excitation electric current instruction calculation unit 12, and a frequency estimation calculation unit 13. Then, the control unit controls the power converter 2.

The feedback control calculation unit 11 inputs a second excitation electric current instruction $i_d^{**}$, the electric current detection value $i_{dc}$ of the d axis, the electric current detection value $i_{qc}$ of the q axis, an estimation frequency $\hat{\omega}_r$, and an output frequency $\omega_1^*$. In the feedback control calculation unit 11, feedback control of the velocity control, the electric current control, and the vector control is calculated. The estimation frequency $\hat{\omega}_r$ is used as a velocity estimation value.

The second electric current instruction value $i_d^{}$ of the d axis that is the second excitation electric current instruction is a variable value, and the secondary magnetic flux $\phi_{2d}$ of the d axis that is variable is generated in the induction motor 1**.

In the velocity control, an electric current instruction value $i_q^*$ of the q axis that is a torque electric current instruction is calculated in accordance with (Expression 16) by the proportional control and the integral control such that the estimation frequency $\hat{\omega}_r$ follows the frequency instruction value $\omega_r^*$.

[Expression 16]

$$i_q^* = (\omega_r^* - \hat{\omega}_r)\left(K_{sp} + \frac{K_{si}}{s}\right) \tag{16}$$

Here, $K_{sp}$ is a proportional gain in the velocity control, and $K_{si}$ is an integral gain in the velocity control.

In the vector control, the voltage instruction values $v_{dc}^*$ and $v_{qc}^*$ are calculated in accordance with (Expression 17) by using the electric current instruction value $i_d^{**}$ of the d axis that is the second excitation electric current instruction, the electric current instruction value $i_q^*$ of the q axis, an electric circuit constant ($R_1$, $L_\sigma$, M, and $L_2$) of the induction motor 1, the secondary magnetic flux instruction value $\phi_{2d}^*$ of the d axis, and the output frequency $\omega_1^*$.

[Expression 17]

$$\begin{bmatrix} v_{dc}^* = R_1^* i_d^{**} - \omega_1^* L_\sigma^* \dfrac{1}{1+T_{acr}s} i_q^* \\ v_{qc}^* = R_1^* i_q^* + \omega_1^*\left(L_\sigma^* \dfrac{1}{1+T_{acr}s} i_d^{**} + \dfrac{M^*}{L_2^*}\phi_{2d}^*\right) \end{bmatrix} \tag{17}$$

Here, $T_{acr}$ is a time constant corresponding to an electric current control delay, $R_1$ is a primary resistance value, $L_\sigma$ is a leakage inductance value, M is a mutual inductance value, and $L_2$ is a secondary inductance value.

In the electric current control, a voltage correction value $\Delta v_{dc}$ of the d axis and a voltage correction value $\Delta v_{qc}$ of the q axis are calculated in accordance with (Expression 18) by the proportional control and the integral control such that the electric current detection value $i_{dc}$ of the d axis and the electric current detection value $i_{qc}$ of the q axis that are each component follow the second electric current instruction value $i_d^{**}$ of the d axis and the electric current instruction value $i_q^*$ of the q axis.

[Expression 18]

$$\begin{bmatrix} \Delta v_{dc} = \left(K_{pd} + \dfrac{K_{id}}{s}\right)(i_d^{**} - i_{dc}) \\ \Delta v_{qc} = \left(K_{pq} + \dfrac{K_{iq}}{s}\right)(i_q^* - i_{qc}) \end{bmatrix} \tag{18}$$

Here, $K_{pd}$ is a proportional gain of the d axis in the electric current control, $K_{id}$ is an integral gain of the d axis in the electric current control, $K_{pq}$ is a proportional gain of the q axis in the electric current control, and $K_{iq}$ is an integral gain of the q axis in the electric current control.

Further, a voltage instruction value $v_{dc}^{}$ of the d axis and a voltage instruction value $v_{qc}^{}$ of the q axis are calculated in accordance with (Expression 19).

[Expression 19]

$$\begin{bmatrix} v_{dc}^{**} = v_{dc}^* + \Delta v_{dc} \\ v_{qc}^{**} = v_{qc}^* + \Delta v_{qc} \end{bmatrix} \tag{19}$$

Figure 10:
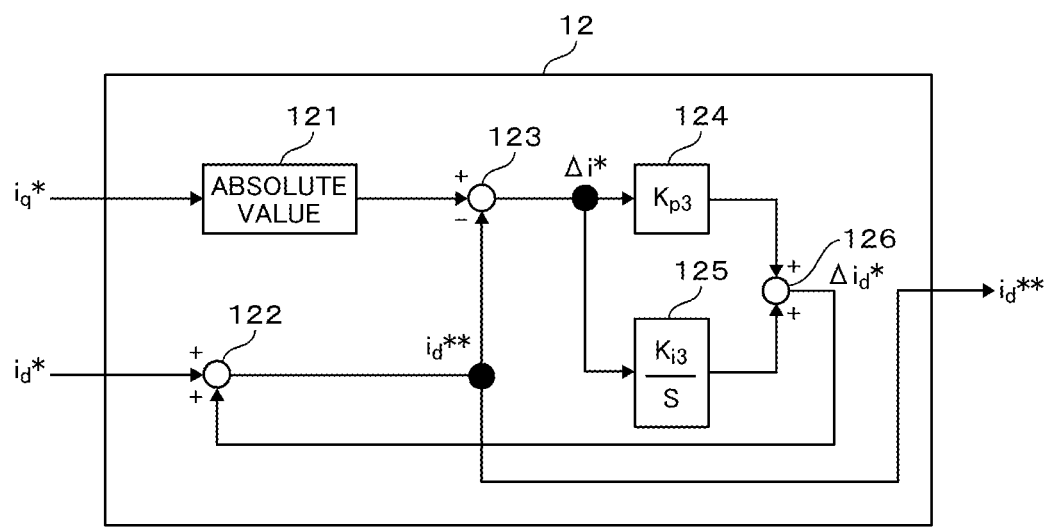
FIG. 10 is a diagram illustrating a configuration of an excitation electric current instruction calculation unit in Example 3.

FIG. 10 is a function block diagram of the excitation electric current instruction calculation unit 12.

In an absolute value calculation unit 121, the electric current instruction value $i_q^*$ of the q axis is input, and an absolute value $|i_q^*|$ of $i_q^*$ is output. In an addition unit 122, a first electric current instruction value $i_d^*$ of the d axis and a correction electric current instruction $\Delta i_3^*$ are added, and the second electric current instruction value $i_3^{**}$ of the d axis is output.

In a subtraction unit 123, the absolute value $|i_q^*|$ of $i_q^*$ and the second electric current instruction value $i_3^{**}$ of the d axis are input, and an electric current instruction deviation $\Delta i^*$ is output. The electric current instruction deviation $\Delta i^*$ is input to a proportional calculation unit 124 having a constant of a proportional gain $K_{p3}$ and an integral calculation unit 125 having a constant of $K_{i3}$, and an output signal thereof is input to an addition unit 126.

In the addition unit 122, the second electric current instruction value $i_d^{**}$ of the d axis is output by calculation represented in (Expression 20).

[Expression 20]

$$i_d^{**} = i_d^* + \Delta i_d^* \tag{20}$$

In the frequency estimation calculation unit 13, the velocity estimation value (the estimation frequency) $\hat{\omega}_r$ and the output frequency $\omega_1^*$ of the induction motor 1 are calculated by (Expression 21).

[Expression 21]

$$\hat{\omega}_r = \frac{1}{1+T_{obs}s} \cdot \left(\frac{v_{qc}^{**} - \omega_1^* L_\sigma \dfrac{1}{1+T_{acr}s}i_d^{**} - (Ri_{qc} + L_\sigma S)i_{qc}}{\dfrac{M}{L_2}\phi_{2d}}\right)$$

$$\omega_1^* = \hat{\omega}_r + \frac{1}{T_2}\frac{i_q^*}{i_d^{**}} \tag{21}$$

Here, R* is an addition value of primary conversion of the primary resistance value and secondary resistance, $T_{obs}$ is an observer time constant, and $T_2$ is a secondary time constant value.

Even in this example in which the velocity control, the electric current control, and the vector control are calculated instead of the V/f control, control is performed such that the second electric current instruction value $i_d^{**}$ of the d axis follows the absolute value of the electric current instruction value $i_q^*$ of the q axis.

According to such control, a highly efficient operation can be attained. Note that, in this example, the velocity estimation value (the estimation frequency) $\hat{\omega}_r$ is calculated, but a velocity detection value $\omega_r$ may be detected by attaching an encoder to the induction motor 1.

In Example 3, as with the example of FIG. 5, the gain $K_{p1}$ of the proportional calculation and the gain $K_{i2}$ of the integral calculation are changed approximately in proportion to the size of the frequency instruction value $\omega_r^*$, and thus, in the low-velocity area to the high-velocity area, the stability of the feedback loop relevant to the highly efficient control can be improved, and the motor electric current value can be minimized within a shorter period of time.

Example 4

Figure 11:
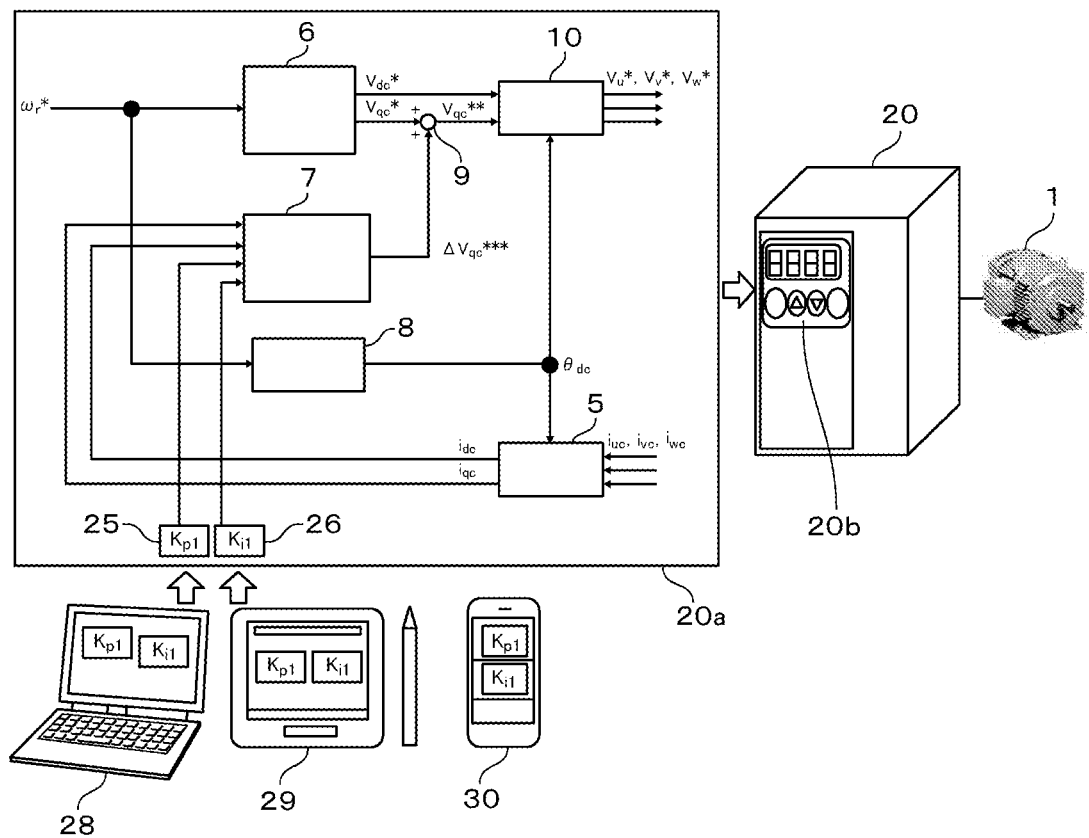
FIG. 11 is a configuration diagram of an induction motor driving system including a power conversion device and an induction motor in Example 4.

FIG. 11 is a configuration diagram of an induction motor driving system including a power conversion device and the induction motor 1 in Example 4.

In this example, this example is applied to the induction motor driving system.

In FIG. 11, the induction motor 1 that is the constituent, the coordinate conversion unit 5, the V/f control calculation unit 6, the voltage instruction correction calculation unit 7, the phase calculation unit 8, the addition unit 9, and the coordinate conversion unit 10 are identical to those in FIG. 1.

The induction motor 1 that is the constituent of FIG. 1 is driven by the power conversion device 20. In the power conversion device 20, the coordinate conversion unit 5, the V/f control calculation unit 6, the voltage instruction correction calculation unit 7, the phase calculation unit 8, the addition unit 9, and the coordinate conversion unit 10 of FIG. 1 are mounted as software 20a, and the power converter 2, the direct-current power source 3, and the electric current detector 4 of FIG. 1 are mounted as hardware.

In addition, the voltage instruction correction calculation unit 7 of the software 20a is capable of setting or changing a predetermined proportional gain 25 and a predetermined integral gain 26 by a higher-level device such as a digital operator 20b, a personal computer 28, a tablet 29, and a smart phone 30.

In a case where this example is applied to the induction motor driving system, a highly efficient operation can be attained in the V/f control or velocity sensorless vector control. In addition, the proportional gain 25 that is a predetermined parameter and the integral gain 26 that is a predetermined parameter may be set on a programmable logic controller, a local area network that is connected to a computer, and a fieldbus of a control device.

Further, this example is disclosed by using Example 1, but Example 2 or Example 3 may be used. In Example 1 and Example 2 described above, the V/f control is performed.

In Example 3, the voltage correction values $\Delta v_{dc}$ and $\Delta v_{qc}$ are prepared from the second electric current instruction value $i_d^{**}$ of the d axis, the electric current instruction value $i_q^*$ of the q axis, the electric current detection value $i_{dc}$ of the d axis, and the electric current detection value $i_{qc}$ of the q axis, and calculation represented in (Expression 19) for adding the voltage correction value and the voltage instruction value of the vector control is performed.

As another method, intermediate electric current instruction values $i_d^{*}$ and $i_q^{}$ represented in (Expression 22) that are used in vector control calculation are prepared from the second electric current instruction value $i_d^{**}$ of the d axis, the electric current instruction value $i_q^*$ of the q axis, and the electric current detection values $i_{dc}$ and $i_{qc}$. Then, vector control calculation represented in (Expression 23) may be performed by using the output frequency value $\omega_1^*$ and the electric circuit constant of the induction motor 1.

[Expression 22]

$$\begin{bmatrix} i_d^{*} = \left(K_{pd1} + \dfrac{K_{id1}}{s}\right)(i_d^{} - i_{dc}) \\ i_q^{**} = \left(K_{pq1} + \dfrac{K_{iq1}}{s}\right)(i_q^* - i_{qc}) \end{bmatrix} \quad (22)$$

Here, $K_{pd1}$ is a proportional gain of the d axis in the electric current control, $K_{id1}$ is an integral gain of the d axis in the electric current control, $K_{pq1}$ is a proportional gain of the q axis in the electric current control, $K_{iq1}$ is an integral gain of the q axis in the electric current control, $T_d$ is an electric time constant ($L_\sigma/R$) of the d axis, and $T_q$ is an electric time constant ($L_\sigma/R$) of the q axis.

[Expression 23]

$$\begin{bmatrix} v_{dc}^{*} = R_1 \cdot i_d^{*} - \omega_1^* \cdot L_\sigma \dfrac{1}{1+T_d s} i_q^{} \\ v_{qc}^{*} = R_1 \cdot i_q^{**} + \omega_1^* \cdot L_\sigma \cdot \dfrac{1}{1+T_q s} i_d^{***} + \omega_1^* \cdot \dfrac{M}{L_2} \cdot \phi_{2d}^* \end{bmatrix} \quad (23)$$

Alternatively, a voltage correction value $\Delta v_{d\_p}^*$ of a proportional calculation component of the d axis, a voltage correction value $\Delta v_{d\_i}^*$ of an integral calculation component of the d axis, a voltage correction value $\Delta v_{q\_p}^*$ of a proportional calculation component of the q axis, and a voltage correction value $\Delta v_q$ of an integral calculation component of a q axis, which are used in the vector control calculation, are prepared from the second electric current instruction value $i_d^{**}$ of the d axis, the electric current instruction value $i_q^*$ of the q axis, the electric current detection value $i_{dc}$ of the d axis, and the electric current detection value $i_{qc}$ of the q axis by (Expression 24). Then, vector control calculation represented in (Expression 25) using the output frequency value $\omega_1^*$ and the electric circuit constant of the induction motor 1 may be performed.

[Expression 24]

$$\begin{bmatrix} \Delta v_{d\_p}^* = K_{pd2}(i_d^{**} - i_{dc}) \\ \Delta v_{d\_i}^* = \dfrac{K_{id2}}{s}(i_d^{**} - i_{dc}) \\ \Delta v_{q\_p}^* = K_{pq2}(i_q^* - i_{qc}) \\ \Delta v_{q\_i}^* = \dfrac{K_{iq2}}{s}(i_q^* - i_{qc}) \end{bmatrix} \quad (24)$$

Here, $K_{pd2}$ is a proportional gain of the d axis in the electric current control, $K_{id2}$ is an integral gain of the d axis in the electric current control, $K_{pq2}$ is a proportional gain of the q axis in the electric current control, and $K_{iq2}$ is an integral gain of the q axis in the electric current control.

[Expression 25]

$$\begin{bmatrix} v_{dc}^{****} = (\Delta v_{d\_p}^* + \Delta v_{d\_i}^*) - \omega_1^* \cdot \frac{L_\sigma}{R_1} \cdot \Delta v_{q\_i}^* \\ v_{qc}^{****} = (\Delta v_{q\_p}^* + \Delta v_{q\_i}^*) + \omega_1^* \cdot \frac{L_\sigma}{R_1} \cdot \Delta v_{d\_i}^* + \omega_1^* \cdot \frac{M}{L_2} \cdot \phi_{2d}^* \end{bmatrix} \quad (25)$$

In addition, the calculation of an output frequency instruction value $\omega_1^{}$ represented in (Expression 26) and vector control calculation represented in (Expression 27) may be performed by using the second electric current instruction value $i_d^{}$ of the d axis, a primary delay signal $i_{qctd}$ of the electric current detection value $i_{qc}$ of the q axis, the frequency instruction value $\omega f$, and the electric circuit constant of the induction motor 1.

[Expression 26]

$$\omega_1^{**} = \omega_r^* + \frac{1}{T_2 \cdot i_d^{**}} \cdot i_{qc} \quad (26)$$

[Expression 27]

$$\begin{bmatrix} v_{dc}^{**} = R_1 \cdot i_d^{} - \omega_1^{} \cdot L_\sigma \cdot i_{qctd} \\ v_{qc}^{} = R_1 \cdot i_{qctd} + \omega_1^{} \cdot L_\sigma \cdot i_d^{} + \omega_1^{} \cdot \frac{M}{L_2} \cdot \phi_{2d}^* \end{bmatrix} \quad (27)$$

Here, $i_{qctd}$ is a signal obtained by $i_{qc}$ passing through a primary delay filter.

In Example 1 to Example 3 described above, the frequency estimation calculation unit 13 calculates the estimation frequency $\omega_r^\wedge$ (the velocity estimation value) and the output frequency $\omega_1^*$, in accordance with (Expression 21), but electric current control and velocity estimation may be used together in q-axis electric current control. As represented in (Expression 28), the velocity estimation value $\omega_r^{\wedge\wedge}$ is calculated.

[Expression 28]

$$\omega_r^{\wedge\wedge} = \left(K_{pq3} + \frac{K_{iq3}}{s}\right)(i_q^* - i_{qc}) \quad (28)$$

Here, $K_{pq3}$ is a proportional gain in the electric current control, and $K_{iq3}$ is an integral gain in the electric current control.

Further, the feedback control calculation unit 11 in Example 3 calculates the velocity estimation value, in accordance with (Expression 21) or (Expression 28), but the velocity detection value may be calculated from an encoder signal by attaching an encoder to the induction motor 1.

Note that, in Example 1 to Example 4, a switching element configuring the power converter 2 may be a silicon (Si) semiconductor element, or may be a wide band gap semiconductor element such as silicon carbide (SiC) or gallium nitride (GaN).

REFERENCE SIGNS LIST

1 Induction motor
2 Power converter
3 Direct-current power source
4 Electric current detector
5 Coordinate conversion unit
6 V/f control calculation unit
7 Voltage instruction correction calculation unit
8 Phase calculation unit
9 Addition unit
10 Coordinate conversion unit
11 Feedback control calculation unit
12 Excitation electric current instruction calculation unit
13 Frequency estimation calculation unit
20 Power conversion device

The invention claimed is:

1. A power conversion device, comprising:
a power converter including a switching element; and
a control unit which controls the power converter,
wherein the control unit calculates a torque electric current detection value and an excitation electric current detection value from an electric current flowing to an external device, and
when an absolute value of the torque electric current detection value is greater than or equal to the excitation electric current detection value, performs control such that the excitation electric current detection value follows the torque electric current detection value.

2. The power conversion device according to claim 1, wherein the control unit controls a voltage instruction value of a torque axis such that the excitation electric current detection value follows the torque electric current detection value.

3. The power conversion device according to claim 2, wherein the control unit calculates the voltage instruction value of the torque axis by proportional control and integral control such that a deviation between the absolute value of the torque electric current detection value and the excitation electric current detection value is zero.

4. The power conversion device according to claim 3, wherein the external device is an induction motor, and
a control gain of the proportional control and the integral control is corrected on the basis of a frequency instruction value of the induction motor.

5. The power conversion device according to claim 1, wherein a voltage instruction value of a magnetic flux axis is zero, and
the control unit includes a V/f control calculation unit which outputs a voltage instruction value of a torque axis proportional to a frequency instruction value.

6. The power conversion device according to claim 1, further comprising:
a recording unit which records parameters of the control unit,
wherein the parameters are set or changed by a connection to a digital operator, a personal computer or a tablet, and a smart phone device.

7. The power conversion device according to claim 1, further comprising:
an electric current detector which detects an electric current of the external device.

8. A power conversion device, comprising:
a power converter including a switching element; and
a control unit which controls the power converter,
wherein the control unit calculates a torque electric current detection value and an excitation electric current detection value from an electric current flowing to an external device, calculates an absolute value of effective power and reactive power, and
when the absolute value of the effective power is greater than or equal to the absolute value of the reactive power, performs control such that the absolute value of the reactive power follows the absolute value of the effective power.

9. The power conversion device according to claim 8, wherein the control unit controls a voltage instruction value of a torque axis such that the absolute value of the reactive power follows the absolute value of the effective power.

10. The power conversion device according to claim 9, wherein the control unit calculates the voltage instruction value of the torque axis by proportional control and integral control such that a deviation between the absolute value of the effective power and the absolute value of the reactive power is zero.

11. The power conversion device according to claim 10, wherein the external device is an induction motor, and
a control gain of the proportional control and the integral control is corrected on the basis of a frequency instruction value of the induction motor.

12. A power conversion device, comprising:
a power converter including a switching element; and
a control unit which controls the power converter,
wherein the control unit calculates a torque electric current detection value and an excitation electric current detection value from an electric current flowing to an external device,
calculates a voltage instruction value of a magnetic flux axis and a voltage instruction value of a torque axis, on the basis of a velocity detection value or a velocity estimation value of the external device, the torque electric current detection value, and the excitation electric current detection value, and
when an absolute value of the torque electric current instruction value is greater than or equal to a first excitation electric current instruction value, corrects the first excitation electric current instruction value such that a second excitation electric current instruction value follows the absolute value of the torque electric current instruction value.

13. The power conversion device according to claim 12, wherein the control unit calculates a correction electric current instruction by proportional control and integral control such that a deviation between the absolute value of the torque electric current instruction value and the second excitation electric current instruction value is zero.

14. The power conversion device according to claim 13, wherein the external device is an induction motor, and
a control gain of the proportional control and the integral control is corrected on the basis of a frequency instruction value of the induction motor.

* * * * *